Patented Jan. 29, 1952

2,583,604

UNITED STATES PATENT OFFICE 2,583,604

LUBRICATING GREASE

Aurelio F. Sirianni and Ira E. Puddington, Ottawa, Ontario, Canada, assignors to The Honorary Advisory Council for Scientific and Industrial Research, Ottawa, Ontario, Canada, a body corporate of Canada No Drawing. Application December 18, 1948, Serial No. 66,131

10 Claims. (Cl. 252—28)

This invention relates to lubricating grease and particularly to such a grease which is based on organic ester oils rather than mineral base oils as the basic lubricating material and which is thickened with colloidal materials, or materials having at least pseudo-colloidal properties, other than soaps such as are customarily employed. Greases of this type, thickened with an inorganic gel, are a particular aspect of the invention; but other colloidal or colloid-like materials may be used. By the term "inorganic gel" it is intended to include not only the true gels such as silica gel but also certain other inorganic voluminous precipitates, such as those derived from ferria, alumina, thoria, titania, and the like. However, the true gels, generally speaking, are preferred.

In the prior are it is known that some of these materials specifically the silica hydrogels, may be used to provide body or thickening effect in mineral base lubricating oils by replacing the normal water content of the gels with an oil of suitable body and lubricating quality. For example, in the patent to Kistler, No. 2,260,625, there is described a process by which the water in a silica gel is replaced by acetone, the acetone by a light hydrocarbon, and the light hydrocarbon by mineral lubricating oil.

The present invention is somewhat related but differs in two important respects from the prior art just referred to. In lieu of mineral lubricating oil, oily synthetic esters are used as the lubricating medium, i. e., the fluid element of the grease, and the silica or other gel is treated in a manner to make it water repellent. This is done in order that the oily ester which combines with the gel to form a colloidal or gel structure will not be displaced when the composition comes in contact with water or with humid atmosphere.

Silica gel, while wet, appears to form a true colloid with water. A similar alcogel may be formed where an alcohol is the liquid medium. Other inorganic materials which absorb large quantities of water, such as the voluminous precipitates of aluminum hydroxide, ferric hydroxide, and the like, and the extremely finely divided oxides and earths such as $TiO_2$, ZnO, bentonite, and the like, as well as organic precipitates such as cellulose and regenerated cellulose are somewhat useful, to the extent that their water content may be replaced with the ester without substantial shrinkage of the gel or quasi-gel structure, and to the extent that the inorganic materials are suitably free from abrasive properties. Bentonite, for example, forms a quasi-gel but is somewhat abrasive where fine qualities of lubrication are requisite. For rougher lubrication, such a material may be used, provided a suitable gel or quasi-gel structure, i. e., one that will be sufficiently free of graininess or discrete inorganic particles and one that holds the liquid phase always available for lubrication, can be obtained. Generally speaking, the true gels such as silica gel are preferred because they have the required properties to a higher degree.

Although various synthetic (and natural) esters have been proposed in the part for uses as lubricants, and certain of them have been proposed as the liquid phase of lubricating greases thickened with soaps, it has not been known previously that these materials may be employed successfully to replace the normal liquid phase of the gels (including pseudo or quasi-gels). We have discovered that this not only is possible but that very good greases can thus be obtained.

The organic esters, especially the aliphatic esters of dibasic acids, some of which are known to have outstanding lubricating properties, tend to be deficient in water resistance, perhaps because of their oxygen content. The gels and quasi-gels themselves are also markedly deficient in water resistance. These combined deficiencies would appear to militate against the utility of such materials. The present invention involves as one important aspect the discovery that synthetic ester-non-soap gel greases may be rendered satisfactorily waterproof or water repellant by mixing the gel itself with a resinous polymeric material such as an alkyd or preferably modified alkyd resin, a silicone resin or polymer, or a hydrocarbon polymer such as polystyrene or the like. The resin may be formed in situ by baking the mixed ingredients. Compositions of a comparable character, based on mineral lubricating oil thickened with inorganic gels and other soap substitutes, are described and claimed specifically in a copending application Serial No. 66,130, filed December 18, 1948, by the present inventors.

The invention will be understood more fully by reference to the following examples.

Example I

A lubricating grease consisting essentially of about 77 to about 99 parts by weight of an oily liquid ester suitable for use as a lubricant, 1 to 20 parts of a non-soap gel or precipitate (dry weight) and 10 to 100%, based on the dry weight of the gel, of a waterproofing agent selected from resinous polymers such as alkyd or modified alkyd resins, silicone polymers derived from silicon chloride, amino silanes, or the like, as more fully described in a copending application filed of even date herewith by the present inventors, Serial No. 66,133, or polymerized hydrocarbon resins such as polystyrene, as disclosed in the application Serial No. 66,130 mentioned above. The ester is preferably an alkyl or at least an aliphatic ester of a dibasic acid, such as phthalic-acid, or sebacic acid, or malonic, succinic, glutaric, adipic, and other homologues. On the other hand, a monobasic acid ester of a polyhydric alcohol, e. g., a glycol or glycerol, also may be used as the liquid phase of the grease or grease-like colloid or quasi-colloid.

Specifically, ethylhexyl sebacate, dibutyl sebacate, dioctyl sebacate, dimethyl phthalate, dioctyl phthalate, and triethyleneglycol-di-2-ethyl butyrate are particularly satisfactory ester oils. The waterproofing materials may be added to the gel prior to incorporating the liquid ester therein, or may be added to the liquid.

*Example II*

A grease of good quality was prepared by incorporating 10% by weight of silica aerogel (dry weight) in dibutyl sebacate and adding 20% by weight, based on the dry weight of the gel, of di-tertiary butoxy di-amino silane. It appears that all other amino silanes are also useful. The waterproofing material may be added to the gel first or may be added to the ester. The composition is preferably subjected to severe shearing, as by passing it through a colloid mill to obtain full dispersion of the gel and the waterproofing material. Thereafter the mixture is baked to obtain the desired moistureproofing qualities, e. g., by subjecting to a temperature of 100° C. to 250° C. for a period of 10 to 60 minutes or more.

*Example III*

Example II was repeated by treating the aerogel with an alkyl silicon chloride vapor, then a grease was formulated as above. The composition was a good grease of excellent texture and good physical stability, even in the presence of liquid water. It appears that the other alkyl silicon chlorides work equally well.

*Example IV*

In lieu of the amino silane of Example 2, a polymerized organo siloxane was used as the waterproofing agent. A good grease was obtained. Various of such polymerized organo siloxanes may be used, so long as they can be mixed adequately with the gel and set by baking to form the desired waterproof material.

*Example V*

Example II was repeated, using a modified alkyd resin (e. g., an alkyd resin modified by producing it in the presence of a fatty acid such as linoleic acid) as the waterproofing medium. The resulting product was a smooth grease of good texture, mechanically stable, and satisfactorily resistant to water, even after shearing in the presence of water at 70° C. for 70 strokes of the plunger in a ⅞" inside diameter 50 cc. capacity grease worker fitted with a plunger having a single 1/32" diameter orifice.

*Example VI*

Examples II to V, inclusive, were repeated, using dioctyl sebacate as the liquid lubricant component. In each instance, with the various waterproofing agents listed in Examples II to V, the resulting product was a good grease, satisfactory from the standpoint of texture, mechanical stability, and resistance to moisture.

*Example VII*

Examples II to V, inclusive, were repeated using dimethyl phthalate as the liquid lubricant, with satisfactory results in each instance.

*Example VIII*

Examples II to V, inclusive, were each repeated using the ester, dioctyl phthalate. A good grease of smooth texture, good mechanical stability and good water resistance was obtained in each instance.

*Example IX*

Examples II to V, inclusive, were each repeated, using triethylene glycol di-2-ethylbutyrate as the liquid. With each waterproofing agent, listed in the Examples II to V, a satisfactory product was obtained.

The proportions of gel and of waterproofing agent may be varied rather widely, depending to some extent, however, upon the viscosity of the ester. The gel, if an aerogel, may be incorporated directly into the ester, but if an aqueous or alcogel is used, the liquid must be replaced by substitution or equivalent treatment employed to prevent the collapsing of the gel structure. This is explained more fully in the copending application Serial No. 66,130, referred to above.

It may be added that the "gel" or voluminous precipitates contemplated for use in the present invention are those which have a very high liquid holding or retaining capacity. They should be capable of retaining at least 100% of water, based upon their dry weight, and preferably hold several hundred percent. For example, bentonite holds about 100% whereas a superfine chrysotile asbestos holds about 600%. A true gel is one in which the structure appears clear and homogeneous, but turbid gels, having a moderate content of non-homogeneous matter may be useful. Regenerated cellulose, starch, inorganic gels, and finely divided non-abrasive materials of high liquid absorbing properties, such as bentonite, finely divided mica or asbestos, cellulose, and the like are all within the general scope of the invention, the inorganic gels such as silica gels being specifically preferred. Protein materials such as keratin may be used also but they usually require special preservatives.

The ester is preferably formed from a monohydric alcohol and a dibasic acid and is preferably fully esterified for oxidation stability. The usual oxidation inhibitors, stringiness agents, extreme pressure additions, oiliness agents and the like may be added to greases prepared according to this invention, as will be obvious to those skilled in the art. An excess of the resin should not be used as it lowers the yield value (thickening effect) of the gel in the oil.

The various organo-silicon type polymers mentioned as water-proofing agents in Examples I, II, III and IV all have the same general final structure, e. g.

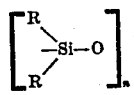

where R is alkyl or alkoxy, as shown in Rochow, "Chemistry of the Silicones" (Wiley and Sons, 1946) pages 46, 51, 54 and 62 to 65.

What is claimed is:

1. A composition consisting essentially of an oily synthetic ester of a dibasic acid thickened to a grease-like consistency with 1 to 20%, dry weight, based on the total composition, of silica gel having its normal water content substantially entirely replaced by said oily ester, and 10% to 100% of an organosilicon polymer waterproofing agent, based on the dry weight of gel, to inhibit moisture absorption by said gel.

2. Composition according to claim 1 wherein said gel is silica aerogel.

3. Composition according to claim 1 wherein said waterproofing agent is a silicone polymer.

4. Composition according to claim 1 wherein said ester is an alkyl sebacate.

5. Composition according to claim 1 wherein said ester is an alkyl phthalate.

6. Composition according to claim 1 wherein said ester is a dialiphatic butyrate.

7. A lubricating grease composition consisting essentially of about 80 to 95 parts by weight of an oily synthetic dialiphatic ester of a dibasic acid, about 5 to 15 parts of silica gel, and about 0.1 to 2 parts of a waterproofing polymeric silicone resin to render said gel water repellent.

8. Composition according to claim 7 wherein said ester is an aliphatic butyrate.

9. Composition as in claim 7 wherein said ester is an alkyl phthalate.

10. Composition as in claim 7 wherein said ester is an alkyl sebacate.

AURELIO F. SIRIANNI.
IRA E. PUDDINGTON.

REFERENCES CITED

The following references are of record in the file of this patent:

UNITED STATES PATENTS

| Number | Name | Date |
|---|---|---|
| 2,260,625 | Kistler | Oct. 28, 1941 |
| 2,456,642 | Merker | Dec. 21, 1948 |